Patented Aug. 9, 1949

2,478,168

UNITED STATES PATENT OFFICE 2,478,168

PROCESS FOR OBTAINING RUTIN FROM BUCKWHEAT

Roderick Koenig Eskew, Glenside, Pa., assignor to the United States of America as represented by the Secretary of Agriculture No Drawing. Application June 7, 1946, Serial No. 675,119

9 Claims. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new process for obtaining pure rutin from buckwheat. Rutin is a drug of the flavinol group, which has recently been found to have therapeutic value, particularly in the reduction of capillary fragility.

Rutin is known to occur in a wide variety of plants, but its most obvious commercial source is buckwheat. A method for its extraction from this plant has been disclosed by J. F. Couch, C. F. Krewson, and J. Naghski in a paper presented before the American Chemical Society, June 13, 1945. This method requires the immediate processing of freshly harvested buckwheat, which limits its application to the season when such material is available. A further disadvantage is that a large amount of alcohol, or other volatile solvent, is required to extract the rutin from the plant, and the tarry materials simultaneously extracted must be removed from the extract through the use of benzol, which constitutes both a health and explosion hazard. I have discovered a new and useful process for producing pure rutin from buckwheat which eliminates the foregoing objectionable features. One object of the new process is to be able, if desired, to produce rutin at any season of the year from buckwheat which has been dried in such a manner as to conserve its rutin content and to permit its storage without deterioration. A further object is to eliminate the necessity for using benzol or other solvent to remove the tarry impurities from the rutin.

The customary procedure for obtaining pure rutin from buckwheat entails harvesting the plant at a desirable degree of maturity and plunging it as promptly as possible into about 16 times its weight, on a dry basis of denatured ethyl alcohol. By means of two alcoholic extractions the rutin is obtained, along with impurities, in an alcoholic solution which is then concentrated by evaporation. After standing to permit crystallization of the rutin, it is filtered off along with tarry fats and resins and is then dried. These fats and resins are then removed from the crude rutin by repeated extraction with benzol. The rutin is finally purified by repeated solution in hot water followed by filtration and crystallization from cold water.

According to my process, either freshly harvested buckwheat or a dried meal prepared from it may serve as the raw material for preparing rutin. Because of the obvious advantages to be had from operating on dried buckwheat meal which can be stored, the process is described on this basis. The freshly harvested buckwheat is cut into lengths about three inches long with a fodder cutter, and then rapidly dried under conditions such as to minimize the loss of rutin and to dry to brittleness the leaves and blossoms, which contain most of the rutin, without completely drying the heavier stem portions of the plant which contain much less rutin. The high rutin-bearing blossom and leaf fractions are then separated from the stems by breaking in a rotating perforated trommel. The desired fractions pass through the perforations while the worthless stems are discharged at the end of the trommel. A further elimination of the stems is obtained by screening the leaf and blossom fraction. The product so produced is termed "leaf meal" and is richer in rutin than the original blend in consequence of having eliminated the stems. A buckwheat meal can also be prepared by drying and grinding the entire plant. Both of such products can be stored for a year without significant loss in rutin content and can serve as well as fresh buckwheat as the raw material for the process of rutin extraction which I have invented.

When dried buckwheat meal, or leaf meal, is extracted with boiling water, three successive extractions may be given using 17 parts of water per pound of meal, which will extract upwards of 95 percent of the rutin. A time of 20 minutes for each extraction is adequate. If desired, extraction may be carried out by the counter-current method commonly employed in such operations. The combined extracts may then be treated as described below, but in order to minimize the use of alcohol, they are desirably evaporated. They are preferably evaporated under vacuum until their consistency is such that further evaporation would prevent their flowing easily from the evaporator. This consistency corresponds approximately to a reading of 1,000 centipoises when measured at 106° F. with a Brookfield viscosimeter using a No. 3 bob at 30 R. P. M. To this viscous concentrate (or to the extracts without concentration) is added an equal volume of 95 percent by volume denatured ethyl alcohol. This causes the colloidal materials, in part pectin and proteins, to agglomerate into an easily filterable curd. This curd is then filtered off, leaving an aqueous alcohol solution of rutin and some soluble impurities. The alcohol is driven off by evaporation and replaced with water. Thereafter, the final purification is carried out by repeated crystallization in the conventional manner as described above. If it is desired to remove the last traces of alcohol insolubles, this may be done by drying the rutin and dissolving it at any stage of its purification in denatured ethyl alcohol, filtering off the residue, replacing the alcohol with water, and proceeding with the recrystallization.

It will be seen from the foregoing that, besides being applicable to fresh buckwheat, this process can be carried out at any season of the year, in contrast to the limited operating season necessary when fresh plants are extracted with alcohol in the conventional method. Furthermore, the extraction is very rapid, requiring at most three 20-minute extractions as contrasted to one 12-hour and one 6-hour extraction required with 95 percent alcohol and green plant. No alcohol or other expensive solvent is lost in the marc, nor are any alcohol recovery steps necessary to prevent such loss. In contrast, the marc from fresh green buckwheat plants extracted with alcohol must, for reasons of economy, be subjected to an alcohol recovery process. It will be seen further that, when hot water is the extracting agent, no tarry fats and resins are removed from the meal, and hence, benzol extraction is not necessary. If it is desired to recover constituents other than rutin from the marc, it may be dried for further extraction.

The following is an example of how my process may be carried out using buckwheat leaf meal.

*Example I*

1,200 pounds of fresh buckwheat plants, having a moisture content of 85 percent and a rutin content on a moisture free basis of about 2.5 percent, are dried at a temperature of 190° F. for a period of 40 minutes, in a dryer providing rapid circulation of air through the bed of material. The product so obtained is separated into leaf meal and stems by breaking in a trommel having holes in the screen $\tfrac{7}{16}$ inch in diameter. The leaf meal fraction is further refined by passing over a two-deck vibrating screen having a 3-mesh and a 60-mesh sieve. 100 pounds of lead meal, containing about 3 percent rutin, are obtained from this screening operation. This meal is covered with 1,700 pounds of boiling water and agitated at the boiling point for 20 minutes, after which time as much water as possible is removed by a suction pump located to draw from beneath a false bottom. This operation is repeated twice more. This will give a total volume of extracts of about 460 gallons, which, after filtration to remove entrained leaf meal, is then evaporated under vacuum to approximately 11.5 gallons. To this an equal volume of 95 percent by volume alcohol is added, and the mixture is heated to its boiling point for one minute to insure complete solution of the rutin. It is then cooled to room temperature and filtered through a filter press. The filtrate is put in an evaporator, and the alcohol is driven off and eventually replaced with approximately the same amount of water. This aqueous slurry of rutin crystals is then put in a tank, and enough water, approximately 63 gallons, is added to dissolve the rutin. This solution is allowed to stand 48 hours at room temperature. The crude rutin is then filtered off and dissolved in the minimum amount of boiling water (approximately 62 gallons). At this point, there is added three pounds of silica gel as an adsorbent for certain impurities. This solution is filtered hot to remove entrained impurities and is then allowed to stand 24 hours until the rutin again crystallizes. This rutin is filtered off, dried, and dissolved in 75 pounds of 95 percent ethyl alcohol. The alcohol solution is filtered, and the alcohol is then driven off by vacuum evaporation and replaced with approximately the same amount of water. This aqueous suspension of rutin crystals is put in a dissolving tank, and the minimum amount of hot water is added to dissolve it (approximately 60 gallons, total water). Three pounds of silica gel are added. The hot solution is filtered and allowed to stand at least 18 hours for crystallizing. The rutin crystals are then filtered off and dried at a temperature not exceeding 130° C. The product is pure rutin, suitable for pharmaceutical uses. All the water used in the recrystallizing steps was previously adjusted with sulfuric acid to have a pH slightly below 7, as alkaline water tends to alter the rutin.

Boiling water is not necessary for the extraction, but is desirable because it is a better solvent for rutin than water of lower temperatures. A water temperature as low as 120° F. may be used with some sacrifice in extraction efficiency. Water temperatures above the boiling point of the extracting medium may also be used by operating under pressure, at the risk of some destruction of rutin.

A ratio of 17 parts by weight of water to one part of leaf meal (or in the case of fresh plant, a total of 17 parts per unit of dry matter in the plant) is not specifically required. Obviously, a larger ratio may be used and a smaller number of extractions, or smaller ratios may be used with a larger number of extractions (or some sacrifice in amount of rutin removed), or extraction may be carried out by a conventional counter-current process. The time of extraction is not limited to 20 minutes. It may be even shorter. Longer extraction times are not ordinarily required, and excessive boiling in hot water is to be avoided as it may result in some destruction of the rutin. The combined extracts need not be evaporated to any specific concentration, although it is obviously desirable to evaporate as much as practicable in order to minimize the amount of alcohol required for precipitation of the curd. Although an equal volume of 95 percent denatured ethyl alcohol is recommended as a curd precipitant, somewhat less can be used with some types of buckwheat. Larger ratios are equally effective, but their use is pointless. Nor is this invention limited to ethyl alcohol as a curd precipitant. Other alcohols such as methyl, isopropyl, and butyl alcohol may also be used.

Having thus described my invention, I claim:
1. A process of preparing rutin from buckwheat, comprising extracting the rutin from buckwheat with water heated to a temperature sufficient to cause solution of the rutin; adding, to the aqueous extract, a water-soluble alcohol, which alcohol is a solvent for rutin, to agglomerate the colloidal materials into a curd; and separating the curd from the aqueous alcoholic solution of rutin.

2. The process of claim 1 in which the heated water is boiling water.

3. The process of claim 1 in which the alcohol is ethyl alcohol.

4. The process of claim 1, in which the extract is concentrated by evaporation and the alcohol added is an equal volume of 95 percent, by volume, of ethyl alcohol.

5. The process of claim 1, in which the extract is concentrated before adding the alcohol.

6. A process of preparing rutin from buckwheat comprising extracting the rutin from dried buckwheat blossom and leaf fractions with water, concentrating the aqueous extract by evaporation of water; adding, to the aqueous concentrate, a water-soluble alcohol, which alcohol is a solvent for rutin, to precipitate the colloidal materials, and separating the precipitate from the aqueous alcoholic solution of rutin.

7. The process of claim 6 in which the alcohol is ethyl alcohol.

8. A process of preparing rutin from buckwheat, comprising extracting the rutin from buckwheat with water; concentrating the aqueous extract by evaporation; adding, to the aqueous extract, ethyl alcohol to precipitate the colloidal impurities; and separating the aqueous alcoholic solution of rutin.

9. A process of recovering rutin from an aqueous extract derived from buckwheat and containing rutin and impurities derived from buckwheat, comprising adding to the aqueous extract a water-soluble alcohol, which alcohol is a solvent for rutin, to precipitate the impurities in the form of curds, and separating the aqueous alcoholic solution of rutin from the curds.

RODERICK KOENIG ESKEW.

REFERENCES CITED

The following references are of record in the file of this patent:

Ter Meulen, Rec. Trav. Chim., v. 42 (1923), p. 380, 1 page.
Schunck, J. Chem. Soc. 53, 262 (1888).
Atree et al., J. Chem. Soc. page 236 (1927).
Smith, J. Chem. Soc. 73, 697 (1898).